United States Patent [19]

Engstrom

[11] Patent Number: 5,230,868
[45] Date of Patent: Jul. 27, 1993

[54] FLUIDIZED BED REACTOR WITH PROTECTED FLUID DISTRIBUTOR

[75] Inventor: Folke Engstrom, San Diego, Calif.

[73] Assignee: A. Ahlstrom Corporation, Karhula, Finland

[21] Appl. No.: 332,730

[22] Filed: Apr. 4, 1989

[51] Int. Cl.⁵ .............................. F27B 15/10; B01J 8/18
[52] U.S. Cl. .................................... 422/143; 34/57 A; 422/140
[58] Field of Search ................ 422/140, 143; 110/245, 110/263; 34/57 A; 122/4 D; 431/7, 170

[56] References Cited

U.S. PATENT DOCUMENTS

| | | |
|---|---|---|
| 4,165,040 | 8/1979 | Beacham et al. |
| 4,240,378 | 12/1980 | Caplin ............................ 122/40 |
| 4,259,088 | 3/1981 | Moss |
| 4,291,635 | 9/1981 | Nelson ............................ 431/7 |
| 4,363,292 | 12/1982 | Engström ....................... 122/40 |
| 4,561,385 | 12/1985 | Cross et al. .................... 122/40 |
| 4,753,177 | 6/1988 | Engström et al. ............. 122/40 |
| 4,817,563 | 4/1989 | Beisswenger et al. ........ 110/245 |
| 4,823,712 | 4/1989 | Wormer ......................... 110/245 |
| 4,843,050 | 6/1989 | Rahlwes et al. ............... 422/143 |
| 4,918,894 | 4/1990 | Page ............................... 422/241 X |

FOREIGN PATENT DOCUMENTS 280016 1/1988 European Pat. Off.

*Primary Examiner*—Robert J. Warden
*Assistant Examiner*—Amalia Santiago
*Attorney, Agent, or Firm*—Nixon & Vanderhye

[57] ABSTRACT

A fluidized bed reactor uses fluid conduits for supplying fluids (such as liquid, gaseous, or fine solid material in suspension fuels), into a reactor chamber. The fluid conduits extend horizontally from, and substantially perpendicularly to, a side wall into the reactor chamber. The fluid conduits are disposed at a level (e.g. about 100-1000 mm) above the fluidizing gas nozzles in the bottom of the reactor chamber. An upright partition, preferably of refractory material, covers the fluid conduits.

12 Claims, 1 Drawing Sheet

FLUIDIZED BED REACTOR WITH PROTECTED FLUID DISTRIBUTOR

BACKGROUND AND SUMMARY OF THE INVENTION

The present invention relates to a fluidized bed reactor comprising a reactor chamber provided with substantially vertical side walls laterally confining a bed of fluidizable particulate material and a gas distributor plate, through which primary gas is fed into the reactor chamber. The reactor chamber has an inlet for particulate bed material and an outlet in its upper part for exhausting gases.

The particulate bed material in the fluidized bed reactor may in part be formed by the material which is to be treated within the reactor. Alternatively, it may be inert, or take part in the treatment, or take part in the heating of the bed. The particulate material is fluidized with primary gas supplied through gas distribution means mounted on the gas distributor plate. The gas distributor plate also provides a support for the particulate bed material.

The fluidizing medium—like the bed material—used may be inert or take part in the treatment to be effected, or take part in the heating of the bed.

Fluidized bed reactors are presently used for many different purposes such as, for example, combustion, gasification, and chemical and metallurgical processes, because they are capable of producing: an efficient contact between a gas and a solid, liquid, or gaseous material to be treated; a high reaction rate; and even temperature and good controllability of the process. The larger the reactor, however, the more difficult it is to carry out stable operations and to control the reactor during changing process conditions. In large reactors it is especially difficult to achieve even distribution of fluid and/or particulate material throughout the whole cross sectional area of the reactor chamber. Uneven distribution may cause significant problems.

In combustion processes, all of particulate, liquid, or gaseous fuels, or a mixture of these, may be combusted in the fluidized bed reactor. The fuel —as well as additives needed for gas cleaning purposes or other chemical reactions—is usually introduced through nozzles in the side walls or through nozzles in the gas distributor plate.

Fluid fuel such as oil is usually introduced through oil lances arranged in openings in the side walls approximately at a level 0.5 m above the gas distributor plate. The oil is injected with pressurized air as distribution medium but can normally reach only about 1 m into the reactor chamber. In big reactors where the distance between the side walls and the center of the reactor chamber exceeds the distance of the oil penetration into the bed, the distribution of oil will be unsatisfactory.

The above mentioned problem cannot be overcome by increasing the oil supply through the lances as the oil supply has to be limited to about 500 kg/h, i.e. the energy density should in general be less than 7500 kJ/m$^2$, in order to prevent overheating and agglomeration of bed particles at locations close to the oil supply. Similar problems will occur when distributing other fluid fuels or reactants into large fluidized bed reactors.

At present there are known fluid fuel nozzle arrangements, such as described in U.S. Pat. No. 4,165,040, which comprise in combination a fluid fuel nozzle and a fluidizing gas nozzle, the combinations being evenly distributed on a distributor plate. The fluid fuel injection nozzles have inlet means for fluidizing gas in a sleeve surrounding the fuel nozzle. This arrangement allows an atomization of fluid fuel. For example, an even distribution of oil with primary air into a combustor may be provided.

A severe problem remains however. The nozzles operate at a high temperature and in a high stress environment, which may cause clogging of the fuel nozzles. It is therefore necessary to periodically check the fuel nozzles and replace deteriorated nozzles in order to ensure an even combustion in the reactor. The risk of clogging is especially high at load variations when the pressure drop over the nozzles changes. Cleaning of nozzles in a grid plate is very complicated during running conditions. Either the whole system has to be shut down for cleaning, or very complicated replaceable nozzle arrangements must be utilized.

U.S. Pat. No. 4,259,088 discloses a fluid fuel distribution arrangement in a fluidized bed apparatus according to which fluid fuel is introduced though horizontal conduits embedded in non-fluidized particulate bed material. The straight fluid conduits are easy to clean even during running. The conduits terminate into depressions in the non-fluidized bed material, the particulate bed material being fluidized in the depressions. This arrangement requires gas distribution nozzles of at least two different heights in the distributor plate for forming a contoured interface between the non-fluidized and the fluidized particulate bed material. The nozzles reaching above the non-fluidized layer of particulate material have to be much higher than the nozzles in the wells. Further the different gas distribution nozzles have to have differently dimensioned openings in order to get an even supply of air over the whole cross-sectional area higher up in the reactor chamber. This is a complicated construction.

The depressions or wells are relatively small and preferably 5-6 inches deep. The introduction of both oil and fluidizing air into such limited zones causes a great risk of agglomeration. It is hard to get an even distribution of nozzles in the relatively narrow area. Uneven distribution of nozzles gives uneven fluidization of particles. Further the oil can wet the bed particles in the wells and cause them to stick to each other forming larger non-fluidizable particles. There is also a risk of the temperature rising too high when fuel and air nozzles are too closely arranged. The fluid fuel nozzles can hardly be arranged at a higher level above the air nozzles when using this arrangement with non-fluidized particulate material covering the fluid conduits. Very large amounts of non-fluidized bed material would be needed to protect the conduit at a high level above the grid and large amounts of bed material would need a very strong support plate. A thick layer of non-fluidized particulates would further lead to very deep, inadequate depressions in the non-fluidized layer.

A fluidized bed reactor is disclosed in FI patent 59860 wherein the reactor chamber is divided by a partition wall, made of water tubes, into two separate fluidized bed sections. The particulate fuel is supplied into the separate sections through a pipe disposed within the central partition wall between the bed sections. The fuel supply system is not easy to clean and does not provide an even distribution of fuel throughout the cross sectional area of the reactor chamber.

It is an object of the present invention to provide even feed and distribution of fluid in large fluidized bed reactors over the whole cross sectional area of the reactor. The fluid may be supplied into the reactor at different distances from the side walls of the reactor. Also according to the present invention, an even distribution of fluid fuel or reactant into large scale fluidized bed reactors is provided through reliable and easy-to-clean fluid inlet means. According to the invention the risk of agglomeration of particulate material in the bed due to fluid distribution is minimized.

According to one aspect of the present invention, there is provided a fluidized bed reactor into which primary gas is distributed, preferably through distribution nozzles in the bottom plate i.e. gas distributor plate, the nozzles having gas outlet openings at the bottom plate or at a level a short distance above the surface of the bottom plate. The primary gas is preferably introduced into the reactor chamber at a substantially constant distance from the bottom plate over the entire cross-sectional area of the reactor chamber. It is possible to arrange several different distributor conduits in the partition if needed.

Fluid supplying means are disposed in the reactor chamber at a distance above the primary gas distribution level. The fluid supplying means comprise a fluid conduit connected to a fluid inlet opening in one side wall. The fluid conduit extends preferably horizontally into the interior of the reactor chamber for distribution of fluid into interior locations too far from the side walls to be reached by fluid injected at the periphery (i.e. wall) of the reactor chamber. The fluid outlet end of the fluid conduit may be at a distance greater than about 1000 mm from the side wall, and between about 100-1000 mm above the primary gas distribution plate (e.g. preferably at a distance between about 300-600 mm above the primary gas introduction level).

The fluid conduit is disposed inside an upright partition mounted on the bottom plate. The partition protects the fluid conduit from erosive and deteriorating conditions in the reactor chamber. The partition covering the fluid conduit extends preferably from the side wall substantially for the whole length of the fluid conduit into the interior of the reactor chamber. The partition may divide the lower part of the fluidized bed partly in sections. Fluid outlets may also be arranged directly on the side walls to distribute fluid in the vicinity of the walls.

The aforesaid upright partition—which preferably is about 100-400 mm wide, to allow the fluid conduit to pass therethrough—is preferably greater than about 1000 mm long, depending on the distance between opposite walls in the reactor chamber. There can be a plurality of fluid conduit upright partition systems reaching various distances into the reactor chamber to ensure that the fluid is evenly distributed over the whole cross sectional area of the reactor chamber. The upright partition may, for example, have a height between about 200-1100 mm above the bottom plate. The partition is preferably made of a refractory or other suitable material resistant to the eroding hot conditions in the reactor chamber. The partition is generally thick enough to hold the fluid conduit and to insulate the conduit to a certain extent from the heat in the reactor chamber.

The present invention provides a simple construction for introduction of fluid into a fluidized bed reactor. The invention may be utilized, e.g., in fluidized bed combustors using liquid fuel—such as oil—or fine particulate fuel suspensions—such as coal suspended in water or steam. An oil-lance may be disposed in an upright partition at a level at which the oil and the primary gas do not negatively interfere with each other. The present invention can also be used to introduce suspensions containing additives, e.g. for gas cleaning purposes, into a combustor. Various kinds of pumpable fluids may be evenly distributed into fluidized bed reactors utilizing the present invention.

According to the present invention, it is possible to achieve the following advantages:
more efficient distribution of fluids and thus better mixing of fluid into large scale fluidized reactors;
minimized risk of local overheating and agglomeration of particles;
ease of cleaning fluid supply means; and
no need for different types of gas distributor nozzles at different locations in the reactor.

BRIEF DESCRIPTION OF THE DRAWINGS

The invention will now be described more in detail with reference to the accompanying drawings, in which.

DETAILED DESCRIPTION OF THE DRAWINGS

Figure 1:
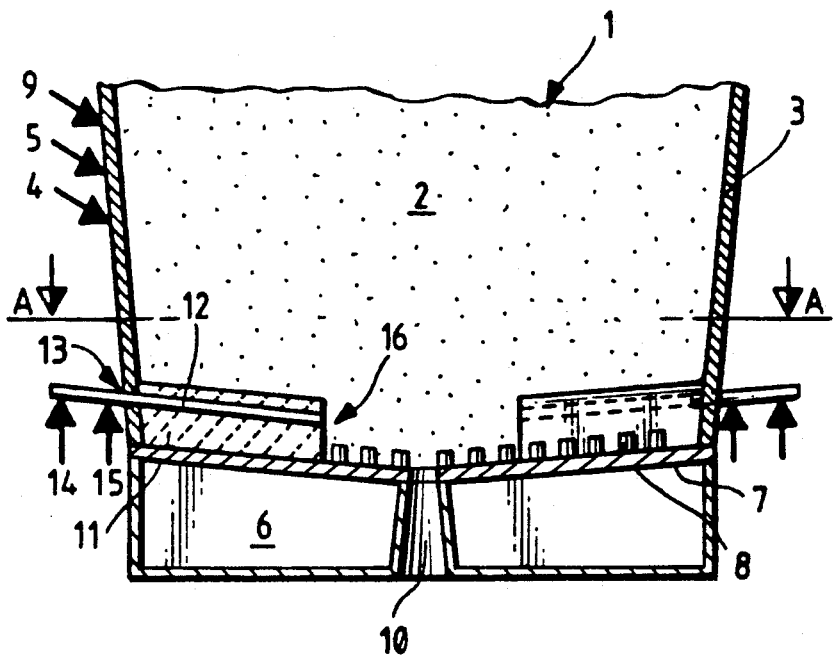
FIG. 1 is a schematic vertical cross-sectional view of an exemplary reactor according to the present invention.

FIG. 1 shows the lower part of a fluidized bed combustor 1 having a combustion chamber 2 with substantially vertical side walls 3 laterally confining a bed of fluidized particulate material. The peripheral walls in the fluidized bed combustor are usually tube walls, such as membrane walls In the lower part of the combustion chamber the walls are lined with refractory to minimize deterioration due to heat and highly erosive conditions there. Particulate bed material is fed into the combustion chamber through an inlet 4. The bed material may consist of inert material such as sand and/or of particulate fuel, if particulate fuel is combusted in the combustor. Also, particulate additives—such as CaO or Ca(OH)$_2$ for gas cleaning purposes—may be added through an inlet 5 into the combustor.

The particulate material in the combustor is fluidized by primary air introduced from an air chamber or windbox 6 beneath the combustion chamber. A bottom plate or gas distributor plate 7 is disposed between the combustion chamber 2 and the air chamber 6. Air nozzles 8 are disposed in openings in the gas distributor plate 7 for introducing air from the air chamber 6 into the combustion chamber 2. The air is introduced at a sufficient velocity to fluidize the particulate material in the combustion chamber 2. The air also provides the oxidizing gas for the combustion process. All air nozzles 8 distribute air at a substantially constant level above the bottom plate 7.

Other suitable gases besides air may be used as the primary fluidizing gas, such as inert gases or gases that take part in chemical processes in the reactor chamber 2. For oxidizing purposes oxygen enriched air can be used. Secondary gas, if needed, can be introduced through nozzles 9 higher up in the reactor chamber 2.

In the bottom plate 7, an ash outlet 10 is provided for discharging ash and eventually other particulate material from the reactor.

Upright partitions 11 are disposed on the bottom plate 7 extending from one side wall 3 into the combustion chamber. The upright partitions 11 extend upwards from the bottom plate to a level considerably above the air nozzles, e.g. about 200–1100 mm above the level of primary gas inlet. The partitions 11 may be formed of refractory material (such as ceramic or fire brick), or other material that is resistant to the adverse conditions prevailing in the lower part of the fluidized bed 1. The partitions 11 can be strengthened with anchors (e.g. metal plates) 17.

Figure 2:
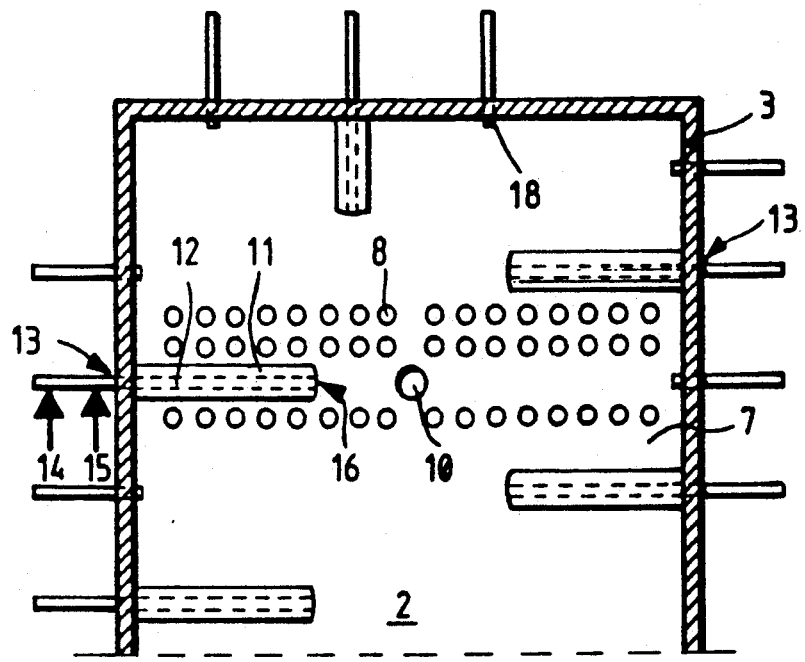
FIG. 2 is a schematic horizontal cross-sectional view of the reactor taken along line A—A of FIG. 1.
Figure 3:
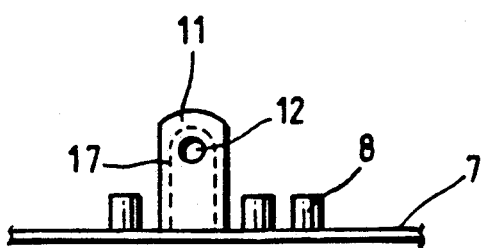
FIG. 3 is an enlarged end view of an upright partition of the reactor of FIG. 1.

Fluid conduits 12, e.g. oil-lances, are arranged to penetrate the side wall 3 through openings 13 and pass inside an upright partition 11 to the inner regions of the combustion chamber 2. Fluid fuel 14, such as oil, is fed through the conduits 12 with distribution air 15 into the combustion chamber 2. "Fluid fuel" as used herein means a fuel that is a liquid, a gas, or even a pumpable fine solid suspension, or any combination of these. The fluid conduits 12 may be used for introduction of other fluids too, such as reactants, natural gas, fast volatilized fuels or reactants, fine divided gasifier char, unburnt fly ash, or different kinds of sorbent used for gas cleaning purposes. The fluid is injected into the combustion chamber 2 through nozzle means 16. Fluid conduits are arranged to distribute fluid over the whole cross sectional area of the combustion chamber, as can be seen in FIG. 2, to ensure an even distribution of fluid. Oil-lances are preferably provided with a fluid distribution capability of greater than about 0.5 $m^2$ per lance.

Fluid conduits 12 of different lengths may be used to facilitate even distribution of fluid. Also fluid nozzles 18 mounted on the side walls may be used to distribute fluid close to the peripheral walls 3 of the combustor chamber 2.

The fluid conduits 12 may all be disposed on the same side wall 3, instead of being connected to all four side walls, e.g. if it is more convenient to handle air and fluid supply from one side of the reactor. Then of course the partitions may have to reach further than half way into the reactor 1.

Also according to the present invention, a method of supplying fuel into a fluidized bed reactor is provided. The method comprises the steps of (a) feeding a primary gas (e.g. air) at a substantially constant horizontal level into the reactor chamber through a gas distributor plate; and (b) feeding fluid directly into a center portion of the reactor chamber to substantially evenly distribute the fluid into the reactor chamber at a level substantially above the horizontal level for feeding the primary gas into the reactor chamber. The fluid is preferably distributed at a level between about 100–1000 mm (e.g. 300–600) above the level for feeding the primary gas. The fluid is preferably fluid fuel where the reactor chamber is a combustor in which a combustion process takes place, and the primary gas is oxidizing gas. The fluid fuel may be the main fuel for the combustion process in the reactor chamber, or it may be an auxiliary fuel merely for starting up the combustion process. Step (b) may be practiced by feeding the fluid into the reactor adjacent the side walls, and also through one or more fluid conduits disposed inside a refractory partition mounted on the gas distributor plate and extending from one side wall into the reactor chamber a substantial distance.

The invention is not intended to be in any way limited to the embodiment as described in the example referring to oil distribution in a fluidized bed reactor, but different modifications and applications are possible without departing from the concept and scope of the invention as claimed in the following claims. The invention is to be accorded the broadest interpretation of the claims so as to encompass all equivalent structures and procedures.

What is claimed is:

1. A fluidized bed reactor comprising:
   a reactor chamber having substantially vertical side walls for laterally confiding a bed of fluidized particulate material;
   a gas distributor plate disposed in said reactor chamber;
   nozzle means for supplying fluidizing gas through said gas distributor plate into the reactor chamber;
   means for supplying fluid into said reactor chamber at a level above said gas distributor plate, said fluid supplying means comprising at least one fluid conduit extending horizontally from one side wall substantially perpendicularly to said side wall into the reactor chamber at a level between about 100–1000 mm above said fluidizing gas supplying nozzle means, and less than one-half the dimension of the reactor chamber from said one side wall to an opposite side wall; and
   means for covering said fluid conduit, said covering means comprising an upright partition mounted on said gas distributor plate and extending from said one side wall substantially the entire length of said fluid conduit into said reactor chamber.

2. A reactor as recited in claim 1, wherein a plurality of said fluid conduits are disposed in said reactor chamber in such a manner as to evenly distribute fluid over the whole cross-sectional area of said reactor chamber.

3. A reactor as recited in claim 2, wherein said fluid conduits comprise conduits of different lengths, disposed so that fluid is distributed relatively uniformly over the entire cross sectional area of the reactor chamber.

4. A reactor as recited in claim 1, wherein said covering means is made of refractory material.

5. A reactor as recited in claim 4, wherein said covering means are strengthened with anchors.

6. A reactor as recited in claim 1, wherein said upright partition is between about 100–400 mm in width.

7. A reactor as recited in claim 1, wherein said upright partition is greater than about 1000 mm long.

8. A reactor as recited in claim 1, wherein said upright partition extends to a height between about 200–1100 mm above said gas distribution plate.

9. A reactor as recited in claim 1, wherein each said fluid conduit extends to a height between about 300–600 mm above said fluidizing gas supplying nozzle means.

10. A reactor as recited in claim 1, wherein the fluid is oil and said fluid conduit is an oil-lance.

11. A fluidized bed combustor comprising:
   a combustion chamber having upright side walls and a bottom plate, cooperating to confine a bed of fluidized particles;
   a plurality of nozzles in said bottom plate for introducing primary oxidizing gas into said combustion chamber at a sufficient velocity to fluidize said particulate bed material;
   at least one fluid fuel conduit connected to an opening in one side wall, each said fuel conduit extending into said combustion chamber at a level above said plurality of nozzles, and less than one-half the dimension of the reactor chamber from said one side wall to an opposite side wall, for distribution of fluid fuel into the center of the combustion chamber and at a level above the introduction of primary oxidizing gas; and fluid fuel conduit protection means surrounding each said fluid fuel conduit, said protection means comprising an elongated refractory partition mounted on said bottom plate and extending from said one side wall into a center of part of said combustion chamber substantially the entire length of said fluid fuel conduit.

12. A combustor as recited in claim 11, wherein a plurality of fluid fuel conduits are disposed in said combustion chamber at a level above the level for introduction of primary oxidizing gas by said plurality of nozzle.

* * * * *